US009536432B2

(12) United States Patent
Laurent et al.

(10) Patent No.: US 9,536,432 B2

(45) Date of Patent: Jan. 3, 2017

(54) METHOD AND DEVICE FOR DISPLAYING THE LIMITS OF FLIGHT MARGINS FOR AN AIRCRAFT

(75) Inventors: Eric Laurent, Colomiers (FR); Nicolas Marty, Saint Sauveur (FR); Laurent Flotte, Aurade (FR)

(73) Assignee: Thales, Courbevoie (FR)

( * ) Notice: Subject to any disclaimer, the term of this patent is extended or adjusted under 35 U.S.C. 154(b) by 716 days.

(21) Appl. No.: 12/815,333

(22) Filed: Jun. 14, 2010

(65) Prior Publication Data

US 2010/0318295 A1 Dec. 16, 2010

(30) Foreign Application Priority Data

Jun. 12, 2009 (FR) ...................................... 09 02874

(51) Int. Cl.

| | |
|---|---|
| ***G08G 5/04*** | (2006.01) |
| ***G08G 5/00*** | (2006.01) |
| *G05D 1/00* | (2006.01) |
| *G05F 7/00* | (2006.01) |
| *G01W 1/10* | (2006.01) |
| *G08B 23/00* | (2006.01) |
| *G01C 23/00* | (2006.01) |
| *G01C 21/00* | (2006.01) |

(52) U.S. Cl.

CPC .......... *G08G 5/0021* (2013.01); *G08G 5/0086* (2013.01); *G08G 5/045* (2013.01)

(58) Field of Classification Search

CPC ....... G01C 23/00; G01C 23/005; G01C 21/20; G08G 5/045; G08G 5/0086; G08G 1/207; G08G 5/0021; G08G 1/16; G08G 1/164; B25J 9/1666; G05B 2219/39082; G05B 2219/39

See application file for complete search history.

(56) References Cited

U.S. PATENT DOCUMENTS

| | | | | |
|---|---|---|---|---|
| 3,626,411 A * | 12/1971 | Litchford | G01S 13/9303 342/32 |
| 5,448,233 A * | 9/1995 | Saban | G01S 17/933 340/961 |
| 6,088,654 A * | 7/2000 | Lepere et al. | 701/301 |
| 6,122,570 A * | 9/2000 | Muller | G01C 5/005 340/970 |
| 7,307,579 B2 * | 12/2007 | Rees | H01Q 1/28 340/961 |
| 7,467,030 B2 * | 12/2008 | Artini | G01C 23/00 340/945 |

(Continued)

FOREIGN PATENT DOCUMENTS

| | | |
|---|---|---|
| EP | 0565399 B1 | 10/1993 |
| FR | 2 905 756 A1 | 3/2008 |
| WO | 2008/031723 A1 | 3/2008 |

*Primary Examiner* — Ryan Zeender

*Assistant Examiner* — Dana Amsdell

(74) *Attorney, Agent, or Firm* — Baker & Hostetler LLP

(57) ABSTRACT

A method of displaying, for a system for anti-collision monitoring of an aircraft, the limits of flight margins in relation to obstructions located in a flight zone, and a device for displaying the limits of operational flight margins and the limits of alert zones, is provided. The operational flight margins in the flight zones not initially envisaged, and the limits of the alert zones around the trajectory of the aircraft, are presented.

11 Claims, 3 Drawing Sheets

(56) References Cited

U.S. PATENT DOCUMENTS

| | | | | |
|---|---|---|---|---|
| 7,493,197 | B2 * | 2/2009 | Bitar | G01C 21/20 342/29 |
| 7,961,116 | B2 * | 6/2011 | Reusser | G01C 23/00 340/976 |
| 7,962,254 | B2 * | 6/2011 | Bouchet | G01C 23/00 340/977 |
| 8,155,805 | B2 * | 4/2012 | Spek | G01C 23/005 701/14 |
| 2002/0128755 | A1 * | 9/2002 | Horvath | G01C 23/00 701/3 |
| 2002/0143439 | A1 * | 10/2002 | Morizet | G01C 23/00 701/3 |
| 2003/0107499 | A1 | 6/2003 | Lepere | |
| 2003/0132860 | A1 * | 7/2003 | Feyereisen | G01C 23/00 340/973 |
| 2003/0195672 | A1 | 10/2003 | He | |
| 2005/0113985 | A1 | 5/2005 | Greene | |
| 2006/0004497 | A1 | 1/2006 | Bull | |
| 2007/0250223 | A1 * | 10/2007 | Francois | G01C 5/005 701/9 |
| 2007/0252748 | A1 * | 11/2007 | Rees | H01Q 1/28 342/29 |
| 2008/0039984 | A1 * | 2/2008 | Bitar | G01C 21/20 701/3 |
| 2008/0198041 | A1 * | 8/2008 | Sallier | G01C 23/005 340/978 |
| 2008/0208400 | A1 * | 8/2008 | Bouchet | G01C 23/00 701/4 |
| 2008/0288169 | A1 * | 11/2008 | Meunier | G01C 5/005 701/301 |
| 2009/0231163 | A1 * | 9/2009 | He | G01C 23/005 340/946 |

* cited by examiner

METHOD AND DEVICE FOR DISPLAYING THE LIMITS OF FLIGHT MARGINS FOR AN AIRCRAFT

CROSS-REFERENCE TO RELATED APPLICATIONS

This application claims priority to foreign Patent Application FR 09 02874, filed on Jun. 12, 2009, the disclosure of which is incorporated herein by reference in its entirety.

FIELD OF THE INVENTION

The invention relates to the field of aerial navigation aids for the prevention of accidents in which a still-maneuverable aircraft collides with an obstacle. The term "obstacle" subsequently designates any non-natural obstruction present in the environment of the aircraft, one then speaks notably of human constructions such as buildings or bridges. Moreover, the term "relief" or "terrain" designates obstructions relating to the natural environment such as mountainous zones.

BACKGROUND OF THE INVENTION

Owing to the type of missions carried out, landing and takeoff in zones that are difficult to access, sometimes unprepared, or flight at low altitude, a helicopter, for example, is a craft which is very highly exposed to the risk of collision with obstacles situated in its close environment. Beyond the geographical aspect, during medical evacuation operations, the use of the helicopter is quite often reserved for emergency survival cases for which swiftness of action and the continuation of the mission are vital in respect of the victim to be rescued. The urgent nature of the mission and the taking of risks which stems therefrom, correspondingly increase the risks of being in proximity to obstacles.

The person skilled in the art is familiar with systems of TAWS type, "Terrain Awareness and Warning System". The aim of these systems is to generate an alert when the aircraft is in a dangerous situation where the operational margins are no longer complied with TAWSs in the guise of autonomous computer or computer integrated with the TCAS (Traffic Collision Avoidance System) function and WXR (Weather Band X Radar) function, in an ISS (Integrated Surveillance System), fulfill a primary function of terrain anti-collision surveillance ("Safety Net") and the aim of which is the emission of audible alerts upon an exceptional approach to the relief allowing the crew to react by engaging a vertical resource before it is too late.

Accordingly, the TAWS systems, decoupled from navigation systems, proceed in two ways. They periodically compare the theoretical trajectory that would be described by the aircraft during a resource and compare it with a sectional cut through the terrain and with the obstacles overflown obtained on the basis of a worldwide digital terrain model embedded aboard the computer. Or then, some TAWSs also integrate modes termed "reactive modes" which, by periodically comparing some of the current parameters of the craft, for example the radio-altitude and the vertical speed, various charts determine whether the current situation of the aircraft is a normal situation or whether it is potentially dangerous. In the latter case, an alert, limited to a verbal message, is generated to inform the crew. The availability of a model of the terrain permits functions making it possible to improve the perception of the situation of the crew. Among them, the alert lines have the objective of delimiting the terrain zones for which a TAWS alert might appear. For their part, the "Alert Areas" show the zones giving rise to a TAWS alert. These alert lines are displayed in the navigation display device, commonly called the "navigation display".

Beyond the logic of alerts, the requirements expressed by pilots are to have at their disposal graphical information allowing them to remain outside of situations that may evolve dangerously.

One known at-risk obstacle zone detection system compares the position of an obstacle in relation to the current position of the aircraft. The calculation method for determining the risk of the dangerous zones does not take into account the current behavior of the aircraft, nor the capabilities of the aircraft. Moreover, the display of the zones of obstacles shows the zones for which alerts are already engaged.

A display of the zones at risk for which alerts are already engaged aboard the aircraft is also known.

SUMMARY OF THE INVENTION

Embodiments of the present invention advantageously improve safety during situations where the helicopter operates with low lateral and vertical separation margins with respect to the terrain or obstacles situated in proximity, and provide the pilot with a representation of the exterior environment allowing him to anticipate at-risk situations.

One embodiment provides a method of displaying, for a system for anti-collision monitoring of an aircraft, the limits of flight margins in relation to obstructions located in a flight zone, the monitoring system generating collision alerts for obstructions located in a protection envelope of the aircraft and being able to calculate at least one flight maneuver predefined in a vertical plane, the method comprising:

- calculating a plurality of radial trajectories in vertical planes distributed over the flight zone, said radial trajectories being rectilinear prolongations, beyond the protection envelope, of the current vertical trajectory of the aircraft in the vertical planes,
- calculating a first monitoring zone in the form of a sector of disk surrounding the current trajectory of the aircraft and a second monitoring zone outside of the first zone in the flight zone,
- calculating flight maneuvers of a first type based on the radial trajectories belonging to the first monitoring zone, and calculating flight maneuvers of a second type based on the radial trajectories belonging to the second monitoring zone,
- calculating the parameters for carrying out the flight maneuvers, comprising a point of intersection with an obstruction, based on each radial trajectory, said parameters comprising the position of the point of initiation of the maneuver,
- displaying the position of the point of initiation of the flight maneuver closest to the current position of the aircraft for each obstruction and for each radial trajectory, said points of initiation of the flight maneuvers of all the radial trajectories representing the flight margin limits in relation to the obstructions on the flight zone.

The flight maneuver of the first type is an initiation and an execution of a climb trajectory of the aircraft and the flight maneuver of the second type is an initiation and an execution of a flattening out trajectory of the aircraft.

Advantageously the flight margins are displayed for obstructions located beyond the protection envelope of the aircraft. This allows the pilot to view the zones at risk without however penetrating into a zone for which the aircraft's anti-collision system generates a collision alert. This makes it possible to reduce the stress factor of the pilot and of his crew as well as the surprise effect of triggering an alert. The protection envelope, or prober, is the monitoring volume calculated by the aircraft anti-collision system. It is generally calculated as a function of avoidance maneuvers predefined in the anti-collision system. A method according to this aspect of the invention displays limits of flight margins in relation to obstructions not to be exceeded in order to avoid situations of alerts in the sense of a TAWS.

Advantageously, the position of the first monitoring zone is correlated with the current dynamic turning parameters of the aircraft in such a way that in the event of turning of the aircraft the sector of disk is moved in rotation as a function of the angle of turn. The limits of the first monitoring zone evolve dynamically as a function of the aircraft's current flight parameters, notably altitude, heading and roll rate.

According to the mode of display, the delimitations between the first flight zone and the second flight zone are displayed.

According to a first mode of display the limits of flight margins are displayed in a flight zone in two dimensions.

According to a second mode of display, the limits of flight margins are displayed in a flight zone in three dimensions.

Another embodiment provides a device for displaying, for a system for anti-collision monitoring of an aircraft, the limits of flight margins in relation to obstructions located in a flight zone, the monitoring system generating collision alerts for obstructions located in a protection envelope of the aircraft, the device comprising a display to display in the flight zone a first monitoring zone in the form of a sector of disk surrounding the current trajectory of the aircraft and a second monitoring zone outside of the first zone, the first monitoring zone displaying the limits of the anti-collision alert zones in relation to the obstructions and the second monitoring zone displaying the operational flight margins in relation to the obstructions, the operational flight margins being configured in such a way that the aircraft can execute a flattening out maneuver for a predefined duration.

Advantageously, an alert zone represents the positions of the obstructions located beyond the protection envelope of the aircraft and for which the monitoring system would trigger collision alerts if the aircraft exceeded these limits while moving according to the instantaneous flight parameters of the aircraft.

In one embodiment, the display device displays the delimitations between the first flight zone and the second flight zone.

Various aspects of the invention make it possible to display the operational limits of margins in the zones far from the trajectory of the aircraft and to maintain the display of the collision alert zones for the positions around the trajectory. The function of the operational margins is to present the positions allowing the aircraft to carry out a flattening out phase for a predetermined duration. This is the maneuver generally carried out while the pilot gets his bearings in a zone not initially envisaged.

BRIEF DESCRIPTION OF THE DRAWINGS

The invention will be better understood and other advantages will become apparent on reading the non-limiting description which follows and by virtue of the appended figures among which.

DETAILED DESCRIPTION

The anti-collision monitoring system makes it possible to achieve the objectives aimed at by making the following systems collaborate.

A system of databases making it possible to have available data regarding location and the altitude of the surrounding obstacles, terrain data, flight parameter data specific to the aircraft (maximum climb capability, flight envelope, flight margins, etc.) and data relating to flight maneuvers, notably avoidance maneuvers.

A system of TAWS type carrying out the trajectory monitoring functions in relation to the terrain and making it possible to raise ad hoc alerts in the event of coming dangerously close to the relief and obstacles.

The avionics systems transmitting the aircraft's flight parameters in real time (heading, roll rate, altitude, position, etc.)

A system of display devices in the cockpit making it possible to present the information formulated by the monitoring system.

Preferably, the functions for carrying out a method according to one embodiment of the invention are integrated into the system of TAWS type.

Figure 1:
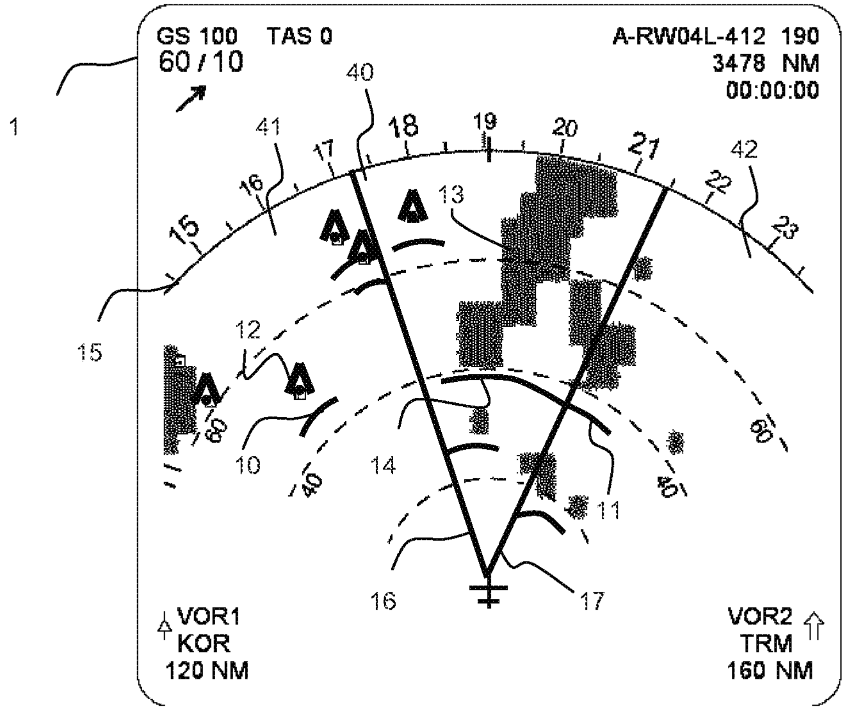
FIG. 1 represents the display of a navigation screen of an aircraft, and the flight zone comprises a monitoring zone at the level of the trajectory of the aircraft and a monitoring zone outside of the trajectory of the aircraft.

One aspect of the invention improves flight safety by showing the pilot the limits of the operational flight margins in relation to the obstacles and terrain. It is sought to show the pilot the operational flight margins around the trajectory initially envisaged. For this purpose, as represented in FIG. 1, two types of zones in the monitoring zone ahead of the aircraft are calculated. The figure represents the display 1 of a navigation screen. The monitoring zone substantially in the form of a half-disk ahead of the aircraft, limited ahead of the aircraft by a circular arc 15 and the diameter of the disk being centered on the current position of the aircraft (the monitoring zone is commonly called the "track"), consists of a first zone 40 surrounding in proximity the trajectory initially envisaged, called the alert zone, and a second zone 41 and 42 outside of the first zone, more precisely at the level of the lateral parts of the first zone in the horizontal plane. The second zone is then formed by a left lateral sector 41 and a right lateral sector 42 with respect to the direction of movement of the aircraft.

The first zone 40 is delimited by two radials 16 and 17 starting at the level of the current position of the aircraft and terminating at the level of the limit 15 of the monitoring zone. This first zone corresponds to an angular sector surrounding the current trajectory of the aircraft. If the aircraft carries out a rectilinear trajectory on a heading straight ahead of the aircraft the angular sector is positioned in the middle of the monitoring zone. If the aircraft carries out a turning trajectory the angular sector of the first zone will be positioned in such a way as to hug the turn carried out as a function of the roll rate. Said first zone displays the limits of alert zones 14 representing the positions for which alerts would be triggered by the anti-collision device if the aircraft crossed these limits while retaining the current flight parameters (vertical speed and speed).

The second zone formed by the sectors 41 and 42 displays the limits of operational margin 10 in relation to obstacles 12 and terrain. The calculation for positioning the limit is different from that for positioning the limits of the alert zones in the first zone. The limit corresponds to the operational margin, more precisely the limit allowing the aircraft to carry out a flattening out maneuver for a predefined duration. The obstacles and terrain positioned in this zone are not envisaged in the initial trajectory of the aircraft. If the aircraft steers in their direction, the pilot will execute a phase of flight by sight under manual control. In this type of situation, the pilot generally carries out a flattening out maneuver for a minimum duration. The operational flight margin corresponds to the time necessary for the execution of a phase of flattening out of the aircraft for a duration predefined in the system.

For the presentation of the limits of the operational margins in the navigation display device, the display method executes a succession of steps.

A first step is the calculation of a plurality of radial trajectories in vertical planes distributed over the flight zone, said radial trajectories being rectilinear prolongations beyond the protection envelope of the current vertical trajectory of the aircraft in vertical planes. These prolongations of vertical trajectory of the aircraft make it possible to detect the obstacles and the terrain zones located on the current vertical trajectory of the aircraft if the azimuthal trajectory of the aircraft was that of the obstacles and obstructions. For this purpose, a plurality of vertical trajectories distributed over the flight zone is calculated according to an angular interval defined in the system. The smaller this angular interval the higher will be the precision of the limits.

A second step is the calculation in the flight zone of the first monitoring zone in the form of a sector of disk surrounding the current trajectory of the aircraft and a second monitoring zone outside of the first zone. The current trajectory corresponds to the azimuthal trajectory of the aircraft. The first zone and the second zone were defined previously.

A third step is the calculation of the flight maneuvers of a first type on the radial trajectories belonging to the first monitoring zone and of the flight maneuvers of a second type on the radial trajectories belonging to the second monitoring zone.

Figure 2:
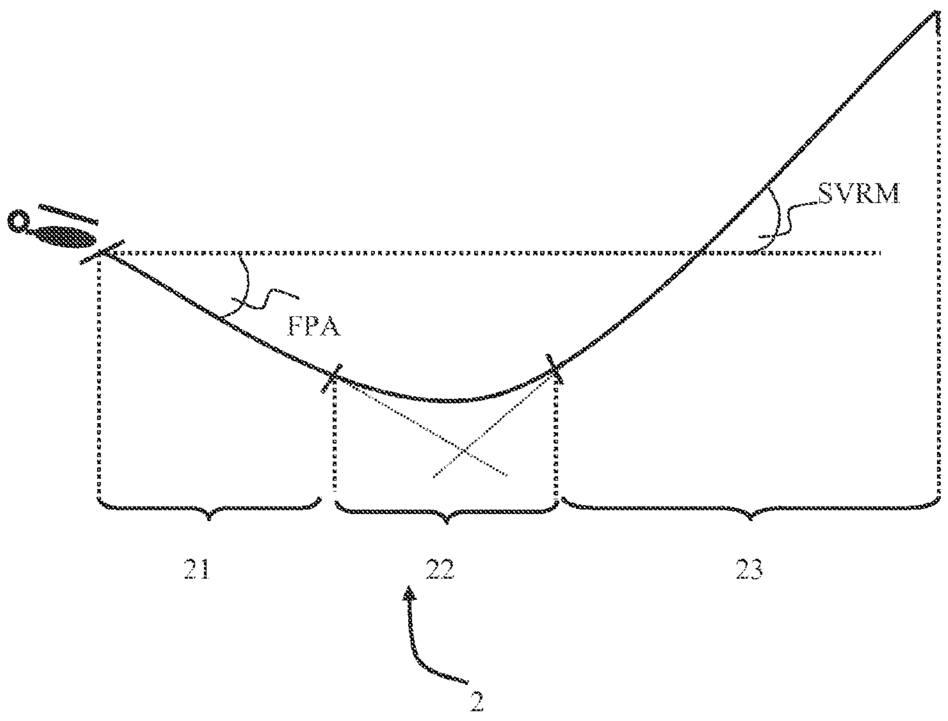
FIG. 2 represents a flight maneuver carrying out a climb phase predefined by the anti-collision monitoring system.

FIG. 2 represents the flight maneuver of the first type. This flight maneuver 2 corresponds to a maneuver of vertical avoidance of an obstruction by climbing. This is a maneuver defined in the anti-collision system for triggering the obstacle or terrain alerts in proximity to the aircraft. This flight maneuver makes it possible to define a protection envelope ahead of the aircraft. An obstruction detected in this protection envelope triggers an alert. The flight maneuver 2 consists of three flight phases. The first flight phase 21 corresponds to an anticipation phase before beginning the vertical upswing phase 23. The duration of this first phase 21 is generally defined in the calculation system and takes into account a reaction time of the pilot and a time for the flight control systems to take the directives into account. The vertical trajectory angle FPA (for "Flight Path Angle") corresponds to the current vertical angle of the trajectory of the aircraft, with respect to a horizontal axis. The angle FPA also serves for the calculation of the vertical trajectories prolonged during the first step of the method. The second flight phase corresponds to a circular arc trajectory for joining up with the climb trajectory 23. The third flight phase 23 corresponds to a climb maneuver according to an angle SVRM with respect to a horizontal axis generally corresponding to the aircraft's maximum climb capabilities. These capabilities are defined in the system as a function of data related for example to the aircraft, to the flight conditions, onboard weight etc.

Figure 4:
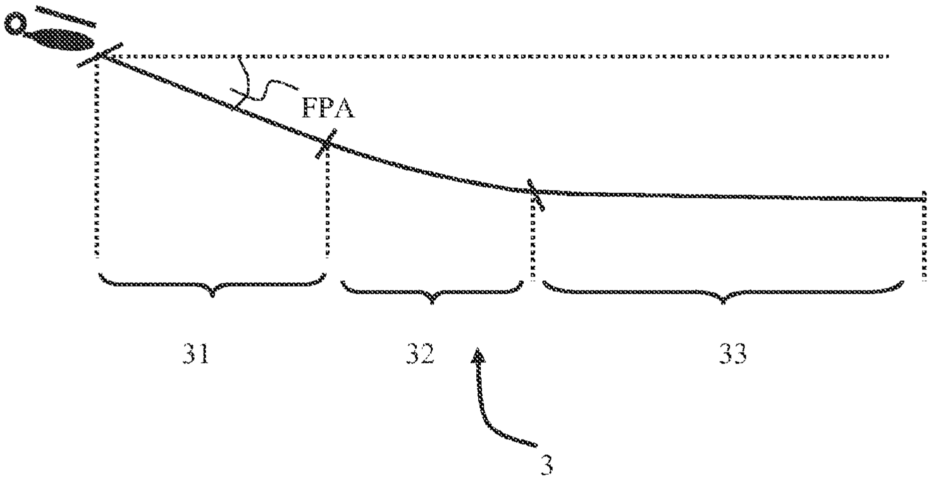
FIG. 4 represents a flight maneuver carrying out a flattening out phase predefined by the anti-collision monitoring system.

FIG. 4 represents the flight maneuver of the second type. This flight maneuver corresponds to a flattening out maneuver for a duration determined in the system. It consists of three phases. The first anticipation phase 31 is similar to the phase 21 of the flight maneuver 2. Thereafter the second phase 32 corresponding to a circular arc for joining up with the flattening out phase. And thereafter the third phase 33 of flattening out for a duration determined in the calculation system. The duration of the flattening out is configurable by the pilot in the system. It is generally necessary to execute such a trajectory when the pilot modifies his trajectory. A pilot carries out a flattening out for a duration required in order to make a decision about the new trajectory to be followed.

A fourth step is the calculation, on each radial trajectory, of the parameters for carrying out the flight maneuvers comprising a point of intersection with an obstruction, said parameters comprising the position of the point of initiation of the maneuver. This step, illustrated by FIGS. 3 and 5, makes it possible to detect the future positions of the aircraft under the instantaneous flight parameter conditions for which the protection envelope, for a specific maneuver, is penetrated by an obstruction. The flight margins are displayed for obstructions located beyond the aircraft's instantaneous protection envelope.

Figure 3:
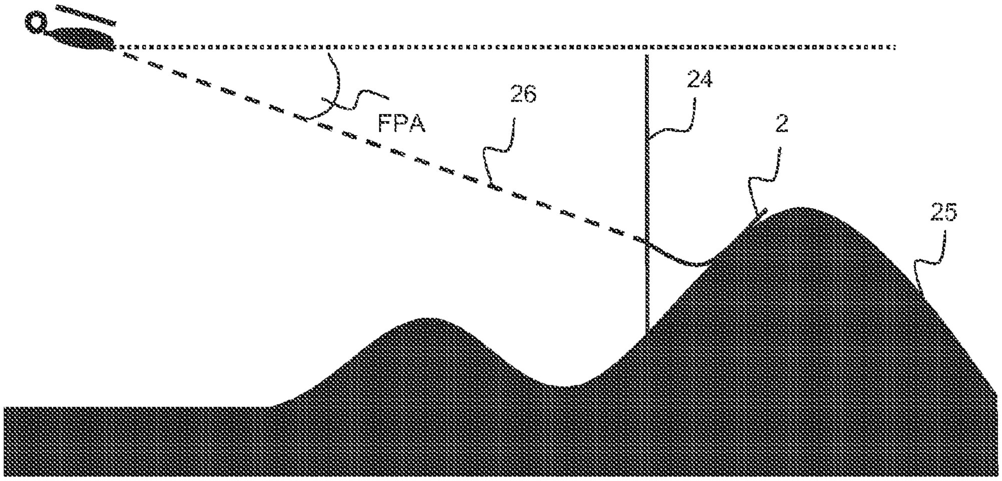
FIG. 3 illustrates the method for positioning a flight margin limit for a monitoring zone of the first type.

FIG. 3 illustrates the calculation of the flight maneuvers of the first type, that is to say of upswing according to the maximum capabilities of the aircraft, on a radial trajectory 26. This radial trajectory 26 does not necessarily correspond to the current azimuthal trajectory of the aircraft. This radial trajectory 26 is located in the flight zone of the first type surrounding the current trajectory of the aircraft. The radial trajectory 26 is the prolongation in the vertical plane according to the vertical flight parameters, these parameters depending on the vertical speed and the flight angle FPA with respect to the horizontal axis. The position of the flight maneuver 2 having a point in contact with an obstruction 25 is calculated along the whole radial trajectory. Among the parameters for carrying out the maneuver 2 the point 24 of initiation of the maneuver 2 is calculated notably.

Figure 5:
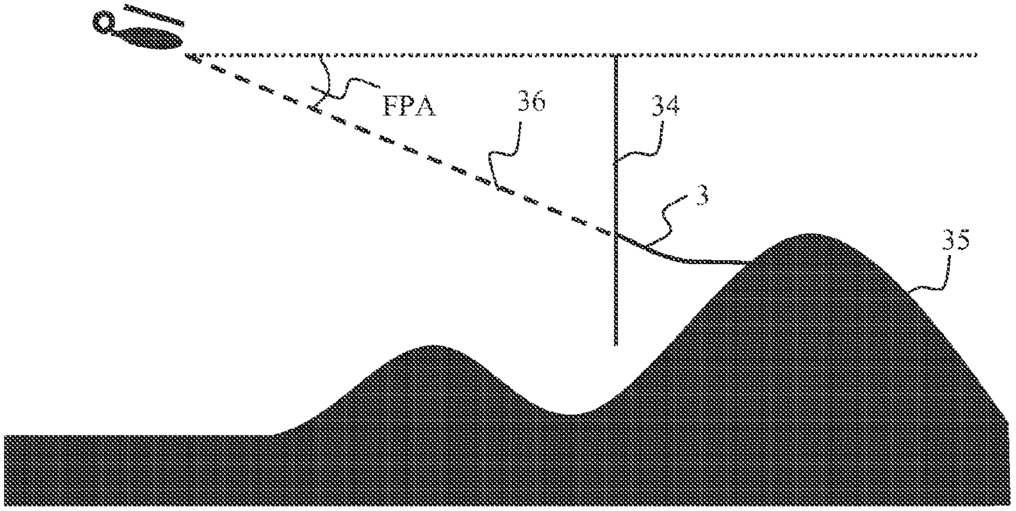
FIG. 5 illustrates the method for positioning a flight margin limit for a monitoring zone of the second type.

FIG. 5 illustrates the calculation of the flight maneuvers 3 of the second type, that is to say of flattening out of the aircraft, on a radial trajectory 36. This radial trajectory 36 is located in the flight zone of the second type, 41 or 42, surrounding the sector of the flight zone of the first type. The position of the flight maneuver 3 having a point in contact with an obstruction 35 is calculated along the whole radial trajectory 36. Among the parameters for carrying out the maneuver 3 the point 34 of initiation of the maneuver 3 is calculated notably. The point of contact with the obstruction 35 determining the positioning of the trajectory 3 is the trajectory end point. The calculation of the flight maneuvers, such as represented by FIGS. 3 and 5, are carried out on all the radials distributed over the flight zone.

A fifth step of the method of displaying the limits of flight margins is the displaying, for each obstruction 25 or 35 and for each radial trajectory 26 or 36, of the position of the initiation point 24 or 34 of the flight maneuver 2 or 3 closest to the current position of the aircraft, said initiation points 24 or 34 of the flight maneuvers of all the radial trajectories representing the flight margin limits in relation to the obstructions on the flight zone. In FIG. 1, the limit 10 and 11 for example represents one or more points of initiation of the maneuvers 3 according to one or more radial trajectories. The invention also represents in the display device, according to the mode of display, the delimitations between the first flight zone, consisting of the sector 40, and the second flight zone, consisting of the sectors 41 and 42. These delimitations 16 and 17 distinguish the first flight zone, where the limits are calculated on the basis of the vertical avoidance flight maneuver, from the second flight zone where the limits are calculated on the basis of the flattening out flight maneuver.

The navigation display device presents in the zone 40 limits of alert zones 14, on the basis of which the aircraft's anti-collision device would trigger alerts if the aircraft approached the obstruction 14 with the same flight parameters (vertical speed, angle of approach FPA) as those of the instantaneous situation. It presents in the zones 41 and 42 the limits of operational flight margins 10 and 11 in relation to the obstructions. These limits correspond to the necessary distance or necessary flight margin for carrying out a flattening out phase for a predetermined duration if the aircraft approached the obstructions with the same flight parameters (vertical speed, angle of approach FPA) as those of the instantaneous situation. The limits displayed in the flight zone of first type and the flight zone of second type therefore have distinct functions. The limits displayed can be in the form of circular arcs or in the form of broken lines.

The method applies to aircraft anti-collision monitoring systems. The method can be implemented by applications integrated into anti-collision devices of TAWS type or by computers dedicated to the aircraft's flight margin display function.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method of determining and displaying on a display device of a system for anti-collision monitoring of an aircraft, limits of flight margins in relation to obstructions located in a flight zone, the monitoring system generating collision alerts for obstructions located in a protection envelope of the aircraft and being able to calculate at least one flight maneuver predefined in a vertical plane, the method comprising:

- determining current flight parameters comprising current position, altitude, heading, speed including vertical speed, angle of approach, and roll rate of the aircraft, with avionic systems transmitting the aircraft's flight parameters in real time,
- determining a current trajectory comprising a vertical trajectory in the vertical plane extrapolated from said current flight parameters with the anti-collision system,
- calculating a plurality of radial trajectories in vertical planes distributed over the flight zone with the anti-collision monitoring system, said radial trajectories being rectilinear prolongations, beyond the protection envelope, of the current vertical trajectory of the aircraft in the vertical planes according to an azimuthal angular interval defined in the system,
- calculating and displaying on the display device in the flight zone a first monitoring zone with the anti-collision monitoring system in a form of a sector of disk surrounding the current trajectory of the aircraft and a second monitoring zone outside of the first monitoring zone in the flight zone, and the second monitoring zone being formed by a left lateral sector and a right lateral sector with respect to a direction of movement of the aircraft,
- calculating flight maneuvers of a first type with the anti-collision monitoring system, wherein the first type of flight maneuver includes three flight phases:
  - a first flight phase corresponding to an anticipation phase,
  - a second flight phase corresponds to a circular arc trajectory for joining up with a climb trajectory, and
  - a third flight phase corresponds to a climb maneuver,
- based on the radial trajectories belonging to the first monitoring zone, and calculating flight maneuvers of a second type with the anti-collision monitoring system, wherein the second type of flight maneuver includes three phases:
  - a first flight phase corresponds to an anticipation phase,
  - a second flight phase corresponding to a circular arc trajectory for joining up with a climb trajectory with a flattening out phase, and
  - a third flight phase corresponding to the flattening out, based on the radial trajectories belonging to the second monitoring zone,
- calculating the parameters for carrying out the flight maneuvers with the anti-collision monitoring system, comprising a point of intersection with an obstruction, based on each radial trajectory, said parameters comprising the position of the point of initiation of the maneuver, and
- displaying on the display device the current position of the aircraft and the position of the point of initiation of the flight maneuver closest to the current position of the aircraft for each obstruction and for each radial trajectory, said points of initiation of the flight maneuvers of all the radial trajectories representing flight margin limits of the aircraft at its current position in relation to the obstructions on the flight zone,
- wherein the display device displays the delimitations between the first flight zone and the second flight zone.

2. The method as claimed in claim 1, wherein the flight margins are displayed for obstructions located beyond the protection envelope of the aircraft and for which the monitoring system would trigger collision alerts if the aircraft exceeded these limits while moving according to the instantaneous flight parameters of the aircraft.

3. The method as claimed in claim 2, wherein the flight maneuver of the first type is an initiation and an execution of a climb trajectory of the aircraft.

4. The method as claimed in claim 3, wherein the flight maneuver of the second type is an initiation and an execution of a flattening out trajectory of the aircraft.

5. The method as claimed in claim 4, wherein the position of the first monitoring zone is correlated with the current dynamic turning parameters of the aircraft in such a way that in the event of turning of the aircraft the sector of disk is moved in rotation as a function of the angle of turn.

6. The method as claimed in claim 1, wherein delimitations between the first flight zone and the second flight zone are displayed.

7. The method as claimed in claim 1, wherein limits of flight margins are displayed in a flight zone in two dimensions.

8. The method as claimed in claim 1, wherein limits of flight margins are displayed in a flight zone in three dimensions.

9. A device of a system for anti-collision monitoring of an aircraft for determining and displaying the limits of flight margins in relation to obstructions located in a flight zone, the monitoring system generating collision alerts for obstructions located in a protection envelope of the aircraft and being able to calculate at least one flight maneuver predefined in a vertical plane, the device comprising:

avionic systems for determining current flight parameters comprising current position, altitude, heading, speed including vertical speed, angle of approach, and roll rate of the aircraft and transmitting said flight parameters in real time, the device being configured for determining a current trajectory comprising a vertical trajectory in a vertical plane extrapolated from said current flight parameters, the device being further configured for calculating a plurality of radial trajectories in vertical planes distributed over the flight zone with the anti-collision monitoring system, said radial trajectories being rectilinear prolongations, beyond the protection envelope, of the current vertical trajectory of the aircraft in the vertical planes according to an azimuthal angular interval defined in the system, the device being configured for calculating and displaying on a display in the flight zone a first monitoring zone in a form of a sector of disk surrounding the current trajectory of the aircraft generated by the anti-collision monitoring system and a second monitoring zone outside of the first monitoring zone generated by the anti-collision monitoring system, the second monitoring zone being formed by a left lateral sector and a right lateral sector with respect to a direction of movement of the aircraft, the first monitoring zone displaying the limits of an anti-collision alert zones in relation to obstructions and the second monitoring zone displaying the operational flight margins in relation to obstructions, and the device being configured for calculating flight maneuvers of a first type which includes three flight phases:

a first flight phase corresponding to an anticipation phase, a second flight phase corresponding to a circular arc trajectory for joining up with a climb trajectory, and a third flight phase corresponding to the climb trajectory, based on the radial trajectories belonging to the first monitoring zone, the device being further configured for calculating flight maneuvers of a second type which includes three flight phases:

a first flight phase corresponding to an anticipation phase, a second flight phase corresponding to a circular arc trajectory for joining up with a climb trajectory with a flattening out phase, and a third flight phase corresponding to the flattening out, based on the radial trajectories belonging to the second monitoring zone, the device being further configured for:

calculating the parameters for carrying out the flight maneuvers comprising a point of intersection with an obstruction, based on each radial trajectory, said parameters comprising the position of the point of initiation of the maneuver, and displaying on the display the current position of the aircraft and the position of the point of initiation of the flight maneuver closest to the current position of the aircraft for each obstruction and for each radial trajectory, said points of initiation of the flight maneuvers of all the radial trajectories representing flight margin limits of the aircraft at its current position in relation to the obstructions on the flight zone, wherein the display displays the delimitations between the first flight zone and the second flight zone.

10. The device as claimed in claim 9, wherein an alert zone represents the positions of the obstructions located beyond the protection envelope of the aircraft and for which the monitoring system would trigger collision alerts if the aircraft exceeded these limits while moving according to the instantaneous flight parameters of the aircraft.

11. The device as claimed in claim 10, wherein it displays the delimitations between the first flight zone and the second flight zone.

* * * * *